US008657585B2

(12) United States Patent
Hong et al.

(10) Patent No.: US 8,657,585 B2
(45) Date of Patent: Feb. 25, 2014

(54) APPARATUS FOR DRIVING COMPRESSOR OF AIR CONDITIONER AND METHOD FOR DRIVING THE SAME

(75) Inventors: Youngho Hong, Changwon-si (KR); Yangkwang Choi, Changwon-si (KR); Wonseok Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 729 days.

(21) Appl. No.: 12/851,062

(22) Filed: Aug. 5, 2010

(65) Prior Publication Data

US 2011/0194947 A1    Aug. 11, 2011

(30) Foreign Application Priority Data

Feb. 8, 2010  (KR) .......................... 10-2010-0011491
Feb. 8, 2010  (KR) .......................... 10-2010-0011492

(51) Int. Cl.
*F04B 49/06*  (2006.01)

(52) U.S. Cl.
USPC ....................................................... 417/44.11

(58) Field of Classification Search
USPC ............ 417/44.11, 53; 318/632, 568.22, 607, 318/608, 437, 807, 268, 255, 270, 271, 272, 318/400.02, 400.06
See application file for complete search history.

(56) References Cited

U.S. PATENT DOCUMENTS

| | | | | |
|---|---|---|---|---|
| 4,841,404 A | * | 6/1989 | Marshall et al. | 361/30 |
| 4,992,715 A | * | 2/1991 | Nakamura et al. | 318/649 |
| 5,010,287 A | * | 4/1991 | Mukai et al. | 318/801 |
| 5,184,057 A | * | 2/1993 | Sakai et al. | 318/803 |
| 5,532,571 A | * | 7/1996 | Masaki et al. | 318/809 |
| 6,208,109 B1 | * | 3/2001 | Yamai et al. | 318/716 |
| 6,359,415 B1 | * | 3/2002 | Suzuki et al. | 318/727 |
| 6,801,011 B2 | * | 10/2004 | Ide | 318/700 |
| 7,005,822 B1 | * | 2/2006 | O'Gorman et al. | 318/608 |
| 7,199,548 B2 | * | 4/2007 | Inaguma et al. | 318/727 |
| 8,150,580 B2 | | 4/2012 | Suzuki | |
| 2004/0184791 A1 | * | 9/2004 | Guyett | 388/800 |
| 2006/0061306 A1 | * | 3/2006 | O'Gorman et al. | 318/105 |
| 2006/0071621 A1 | | 4/2006 | Sugiura et al. | |
| 2007/0107973 A1 | | 5/2007 | Jiang et al. | |
| 2009/0251096 A1 | * | 10/2009 | Schulz et al. | 318/801 |

FOREIGN PATENT DOCUMENTS

CN    1278483    10/2006

OTHER PUBLICATIONS

U.S. Notice of Allowance issued in U.S. Appl. No. 12/851,019 dated May 18, 2012.
Chinese Office Action dated Nov. 21, 2012.

* cited by examiner

*Primary Examiner* — Devon Kramer
*Assistant Examiner* — Amene Bayou
(74) *Attorney, Agent, or Firm* — KED & Associates LLP

(57) ABSTRACT

An apparatus and method for driving a compressor of an air conditioner are disclosed. When compensating for load torque of a compressor (e.g., a single-rotary compressor) of an air conditioner, a method for providing a compensation torque using an optimum phase compensation angle is used. In relation to a phase current or a frequency of a given motor, an optimum phase compensation angle causing a minimum speed ripple is measured, and the measured optimum phase compensation angle is stored in the form of a table. In the actual driving of the motor, the method applies a compensation torque having an optimum phase compensation angle to the motor by referring to the table.

10 Claims, 11 Drawing Sheets

FIG. 9

| Frequency | Phase compensation angle |
|---|---|
| 15 | 5 |
| 17 | 5 |
| 19 | 5 |
| 21 | 10 |
| 23 | 14 |
| 25 | 18 |
| 27 | 14 |
| 29 | 28 |
| 31 | 28 |
| 35 | 35 |
| 37 | 28 |
| 39 | 35 |
| 41 | 35 |
| 43 | 35 |
| 45 | 52 |

FIG. 10

| Phase current | Phase compensation angle |
|---|---|
| 2.5 | 5 |
| 3 | 5 |
| 3.5 | 18 |
| 4 | 28 |
| 4.5 | 28 |
| 5 | 35 |
| 5.5 | 53 |

APPARATUS FOR DRIVING COMPRESSOR OF AIR CONDITIONER AND METHOD FOR DRIVING THE SAME

CROSS-REFERENCE TO RELATED APPLICATION

This application claims the priority benefit of Korean Patent Application No. 10-2010-0011491, filed on 8 Feb. 2010 and Korean Patent Application No. 10-2010-0011492, filed on 8 Feb. 2010, respectively, in the Korean Intellectual Property Office, the disclosure of which is incorporated herein by reference.

BACKGROUND OF THE INVENTION

1. Field of the Invention

The present invention relates to an apparatus for driving a compressor of an air conditioner and a method for driving the same, and more particularly to an apparatus for driving a compressor to reduce a speed ripple, and a method for driving the same.

2. Description of the Related Art

In general, an air conditioner is arranged at any indoor space or wall of a room, a living room, an office, a store, etc. to adjust temperature, humidity, cleanness, and flow of indoor air, such that a pleasant indoor environment can be maintained in each indoor space.

Generally, the air conditioner is classified into an integration-type air conditioner and a separation-type air conditioner. The integration-type air conditioner has the same function as that of the separation-type air conditioner. However, there are a few differences between them. That is, the integration-type air conditioner integrates a cooling function and a heat-radiation function into one structure, and is directly mounted to a wall via a hole formed in the wall or is directly hung on a window. The separation-type air conditioner includes an indoor unit that is installed indoors to heat/cool indoor air, and an outdoor unit that is installed outdoors to perform a heat-radiation function and a compression function. The indoor unit and the outdoor unit are interconnected via a refrigerant pipe.

On the other hand, a motor is used for a compressor, a fan, etc. of the air conditioner, and a driving device for driving the motor (i.e., a motor driving device) is also used for the air conditioner. The motor driving device receives commercial AC power as an input, converts the commercial AC power into a DC voltage, converts the DC voltage into other commercial AC power having a predetermined frequency, and provides the other commercial AC power to the motor, such that a compressor, a fan, etc. of the air conditioner can be driven.

SUMMARY OF THE INVENTION

Accordingly, the present invention is directed to an apparatus and method for driving a compressor of an air conditioner that substantially obviate one or more problems due to limitations and disadvantages of the related art.

Therefore, the present invention has been made in view of the above problems, and it is an object of the present invention to provide an apparatus for driving a compressor of an air conditioner so as to minimize a speed ripple of a motor used for driving the compressor.

In accordance with an aspect of the present invention, the above and other objects can be accomplished by the provision of an apparatus for driving a compressor of an air conditioner including a motor configured to rotate the compressor, an inverter that includes a plurality of switching elements, outputs AC power having a predetermined phase and a predetermined amplitude by a switching operation of the switching elements, and drives the motor, and a controller configured to detect a frequency and a phase current of the motor for the compressor, determine a phase compensation angle corresponding to the frequency or the phase current, and compensate for load torque of the motor using the determined phase compensation angle.

In accordance with another aspect of the present invention, there is provided a method for controlling a compressor driving apparatus of an air conditioner including detecting a frequency of a motor for use in the compressor, detecting a phase current of the motor for use in the compressor, determining a phase compensation angle corresponding to the frequency or the phase current, and compensating for load torque of the motor using the determined phase compensation angle.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a table configured on the basis of the measurement result of FIG. 7.

FIG. 10 is a table configured on the basis of the measurement result of FIG. 8.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
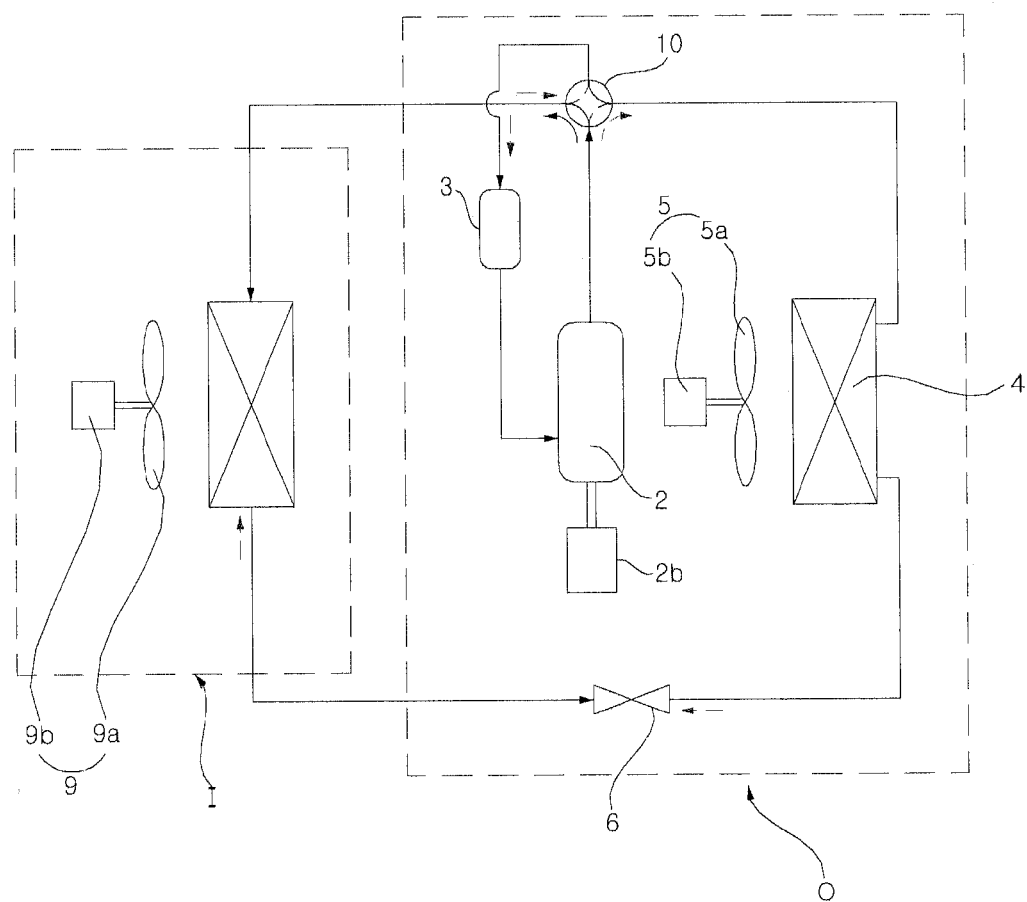
FIG. 1 is a schematic view illustrating an air conditioner according to an embodiment of the present invention.

FIG. 1 is a schematic view illustrating an air conditioner according to an embodiment of the present invention.

Referring to FIG. 1, the air conditioner 50 is generally divided into an indoor unit I and an outdoor unit O.

The indoor unit O includes a compressor 2 for compressing a refrigerant, a compressor driving unit 2b for driving the compressor 2, an outdoor heat-exchanger 4 for radiating heat of the compressed refrigerant, an outdoor ventilator 5 including not only an indoor fan 51 arranged at one side of an outdoor heat-exchanger 4 to expedite heat radiation of refrigerant but also a driving unit 5b to rotate the outdoor fan 5a, an expansion valve 6 for expanding a condensed refrigerant, a cooling/heating switching valve 10 for switching the flow path of the compressed refrigerant, an accumulator 3 for temporarily storing a gaseous refrigerant, removing moisture and foreign matter from the gaseous refrigerant, and transmitting a refrigerant having constant pressure to the compressor 2, and the like.

The indoor unit I includes an indoor heat-exchanger 8, an indoor ventilator 9, and the like. The indoor heat-exchanger 8 is installed indoors to perform the cooling/heating functions. The indoor ventilator 9 includes not only an indoor fan 9a installed at one side of the indoor heat-exchanger 8 to expedite heat radiation of refrigerant but also a driving unit 9b to rotate the indoor fan 9a.

One or more indoor heat-exchangers may be used. The compressor 2 may be at least one of an inverter compressor or a constant-speed compressor.

In addition, if necessary, the air conditioner 50 may be configured as a cooling device for cooling indoor air, or may also be configured as a heat-pump to cool or heat the indoor air.

On the other hand, an apparatus for driving a compressor of an air conditioner according to an embodiment of the present invention may be each driving unit 2b for operating the compressor 2 of the air conditioner, as shown in FIG. 1.

Meanwhile, although FIG. 1 shows one indoor unit I and one outdoor unit O, the apparatus for driving the compressor of the air conditioner according to the embodiment of the present invention is not limited only thereto, and can also be applied not only to a multi-type air conditioner including a plurality of indoor units and a plurality of outdoor units but also to another air conditioner including one indoor unit and a plurality of outdoor units without departing from the principles and spirit of the present invention.

Figure 2:
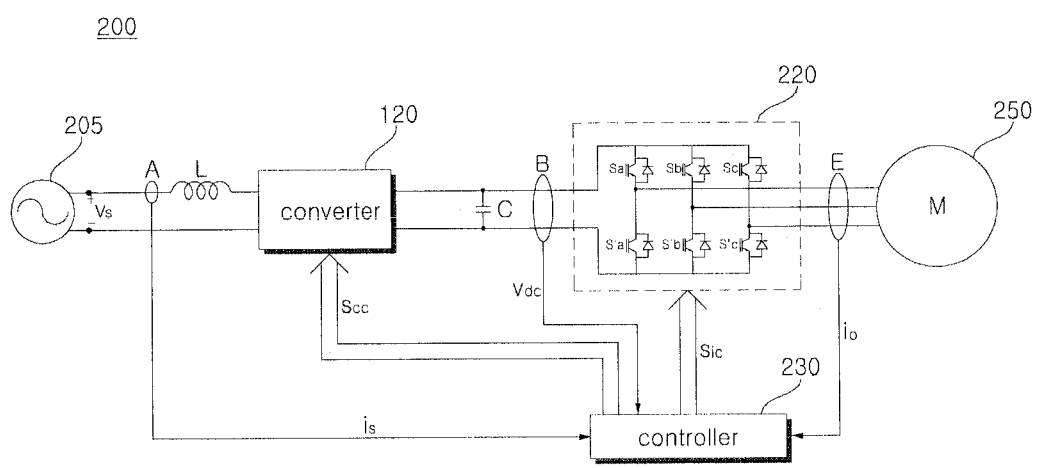
FIG. 2 is a circuit diagram illustrating an apparatus for driving a compressor of an air conditioner according to an embodiment of the present invention.

FIG. 2 is a circuit diagram illustrating an apparatus for driving a compressor of an air conditioner according to an embodiment of the present invention.

Referring to FIG. 2, the apparatus for driving the compressor of the air conditioner according to one embodiment of the present invention may include a motor for operating the compressor as previously stated above. Particularly, the compressor driving apparatus may be a load-dependent compressor, operation variation of which is greatly affected by load types, for example, a single-rotary-type compressor. Although a variety of compressors may be applied to the present invention without any restriction, for convenience of description and better understanding of the present invention, the apparatus for driving the compressor according to the embodiment of the present invention will hereinafter be described in detail using a single-rotary compressor as an example.

Referring to FIG. 2, the driving apparatus 200 includes a converter 120, an inverter 220, a controller 230, an input current detection unit A, and an output current detector (E). In addition, the apparatus 200 for driving a motor may further include a capacitor C, a DC-terminal voltage detector B, etc. as necessary.

A reactor L may be located between a commercial AC power source 205 and a converter 120, such that it performs power factor correction or a step-up (or boost) operation. In addition, the reactor L may also limit a harmonic current caused by the high-speed switching of the converter 120.

An input-current detector A may detect an input current ($i_s$) received from the commercial AC power source 205. In order to detect the input current ($i_s$), a current sensor, a current transformer (CT), a shunt resistor, etc. may be used. The detected input current ($i_s$) is a pulse-shaped discrete signal, and may be input to the controller 230 to estimate an input voltage (vs) as well as to generate a converter switching control signal (Scc).

The converter 120 may convert the commercial AC power 205 passing through the reactor L into DC power, and output the DC power. Although the commercial AC power 205 of FIG. 2 is shown as single-phase AC power, it should be noted that the commercial AC power 205 may also be three-phase AC power as necessary. The internal structure of the converter 120 may be changed according to types of the commercial AC power 205. For example, provided that the commercial AC power 205 is the single-phase AC power, a half-bridge converter wherein two switching elements and four diodes are connected to one another may be employed. Provided that the commercial AC power 205 may be the three-phase AC power, 6 switching elements and 6 diodes may be employed.

The converter 120 may include one or more switching elements, such that it can perform a boosting operation, power factor improvement, and DC-power conversion by the switching operation of the switching elements. Meanwhile, the converter 120 may be comprised of a diode and the like, such that it may also perform a rectifying operation without any additional switching operation.

The capacitor C may be connected to an output terminal of the converter 120. The capacitor C smoothes the converted DC power output from the converter 120. For convenience of description, an output terminal of the converter 120 is hereinafter referred to as a DC terminal or a DC link terminal. The DC voltage smoothed in the DC terminal is input to the inverter 220.

The DC-terminal voltage detector B may detect a DC-terminal voltage (Vdc) of both ends of the capacitor C. For this operation, the DC-terminal voltage detector B may include a resistor, an amplifier, and the like. The detected DC-terminal voltage (Vdc) is a pulse-shaped discrete signal, and may be input to the controller 230 to estimate an input voltage (vs) as well as to generate a converter switching control signal (Scc).

The inverter 220 includes a plurality of inverter switching elements, converts the DC power smoothed by on/off operations of the switching elements into three-phase AC power, and outputs the resultant three-phase AC power to a three-phase motor 250.

The inverter 220 includes upper-arm switching elements (Sa, Sb, Sc) and lower-arm switching elements (S'a, S'b, S'c). In more detail, the inverter 220 includes a total of three pairs (Sa&S'a, Sb&S'b, Sc&S'c) of upper-arm and lower-arm switching elements, wherein the three pairs (Sa&S'a, Sb&S'b, Sc&S'c) are connected in parallel to one another. In addition, one upper-arm switching element (Sa, Sb or Sc) is connected in series to one lower-arm switching element (S'a, S'b or S'c) such that one pair (Sa&S'a, Sb&S'b or Sc&S'c) of upper-arm and lower-arm switching elements is formed. One diode is connected in inverse parallel to one switching element (Sa, S'a, Sb, S'b, Sc or S'c)

The switching elements contained in the inverter 220 receive an inverter switching control signal (Sic) from the controller 230, such that on/off operations of the individual switching elements are performed on the basis of the inverter switching control signal (Sic). As a result, three-phase AC power having a predetermined frequency is output to the three-phase motor 250.

The output current detector (E) detects an output current ($i_o$) flowing between the inverter 220 and the three-phase motor 250. In other words, the output current detector (E) detects a current flowing in the motor 250. The output current detector E may detect all output currents of individual phases, or may also detect a one-phase or two-phase output current using three-phase equilibrium.

The output current detector (E) may be located between the inverter 220 and the motor 250. For current detection, a current sensor, a current transformer (CT), a shunt resistor, or the like may be used as the output current detector (E). For example, one end of the shunt resistor may be connected to each of three lower-arm switching elements (S'a, S'b, S'c) of the inverter 220.

The detected output current ($i_o$) is a pulse-shaped discrete signal, may be applied to the controller 230, and may be used to estimate an input current on the basis of the detected output current ($i_s$). In addition, the detected output current ($i_o$) may be used to generate the inverter switching control signal (Sic).

The controller 230 may estimate the position of the motor 250 (i.e., the rotor position of the motor 250) on the basis of the output current ($i_o$) detected by the output current detector (E), and may also calculate the rotating speed of the motor 250. Based on the estimated position and rotating speed of the motor 250, the controller 230 performs a variety of control operations to drive the motor 250 in response to a speed command, generates a pulse-width-modulated inverter switching control signal (Sic), and outputs the resultant inverter switching control signal (Sic).

In this way, the above-mentioned control operation, under the condition that an additional motor position detector element, etc. is not used, for detecting an output current, estimating the position and speed of the motor 250 in response to the output current, and performing feedback control causing the estimated speed to change in response to a speed command is called 'sensorless algorithm-based control'. This sensorless algorithm-based control may be not performed during the initial driving of the motor 250, and may start operation when the rotating speed of the motor 250 is equal to or higher than a predetermined value.

The controller 230 may compensate for load torque of the motor 250 in response to the selected optimum load pattern table. Therefore, during the constant speed operation of the motor 250, the speed ripple caused by the load torque can be simply and greatly reduced.

On the other hand, the controller 230 controls the switching operation of the inverter 220. For this operation, the controller 230 receives the output current ($i_O$) detected by the output current detector (E), generates the inverter switching control signal (Sic), and outputs it to the inverter 220. The inverter switching control signal (Sic) may be a switching control signal for Pulse Width Modulation (PWM).

In the meantime, the controller 230 may also perform the switching operation of the converter 120. For this operation, the controller 230 receives a DC-terminal voltage (Vdc) detected by the DC-terminal voltage detector (B) as an input, generates a converter switching control signal (Scc), and outputs it to the converter 120. The converter switching control signal (Scc) may be a PWM switching control signal.

The three-phase motor 250 includes a stator and a rotor. AC power of each phase having a predetermined frequency is applied to a coil of a stator of each phase such that the rotor starts rotating. Various types of motors 250 may be used, for example, a brushless DC (BLDC) motor, a Synchronous Reluctance Motor (synRM), etc.

The three-phase motor 250 may be a motor for use in a compressor of the air conditioner. Specifically, the three-phase motor 250 may be a single-rotary compressor causing serious load variation.

In the meantime, the controller 230 may be an outdoor-unit controller (hereinafter referred to as an outdoor controller), and may further communicate with an indoor-unit controller (hereinafter referred to as an indoor controller) capable of being separately installed in the indoor unit as necessary. The outdoor controller receives an operation command by communicating with the indoor controller, and decides a speed command value on the basis of the received operation command. A detailed description of the speed command value will be described later.

In addition, the controller 230 of the motor driving apparatus 200 of the air conditioner may simultaneously control not only a motor for a fan used in the outdoor unit but also the motor 250 for the compressor.

FIGS. 3 to 6 illustrate methods for controlling the compressor driving apparatus according to one embodiment of the present invention.

Figure 3:
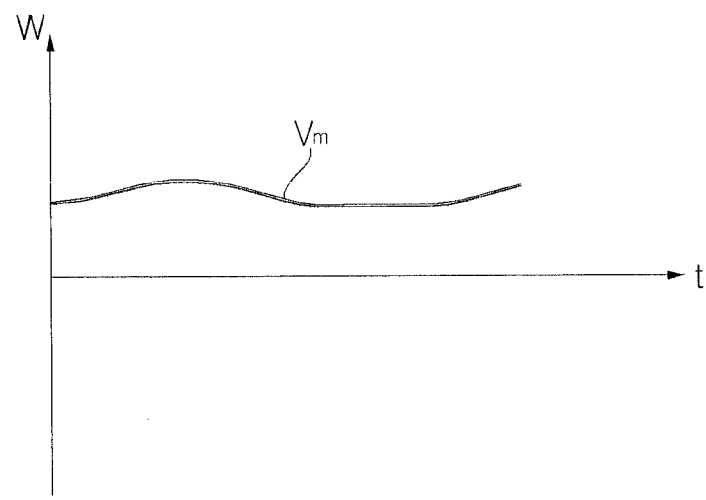
FIGS. 3 to 6 illustrate methods for controlling the compressor driving apparatus according to one embodiment of the present invention.

FIG. 3 shows an angular velocity variation of the motor of the single-rotary compressor. Ideally, the angular velocity of the motor must be constant. However, as shown in FIG. 3, the speed of the motor driving the compressor is not constant and is changeable. That is, the speed ripple unavoidably occurs. This speed ripple may be generated when the compressor 10 compresses the refrigerant.

In other words, while the compressor 10 compresses the refrigerant, load torque of a non-linear pattern is applied to the motor 250 in response to the compression of fluid refrigerant, and there arises the speed ripple wherein the rotating speed of the motor 250 is periodically changed within a predetermined range by the non-linear load torque.

In order to remove the speed ripple, a method for compensating for load torque may be used.

Figure 4:
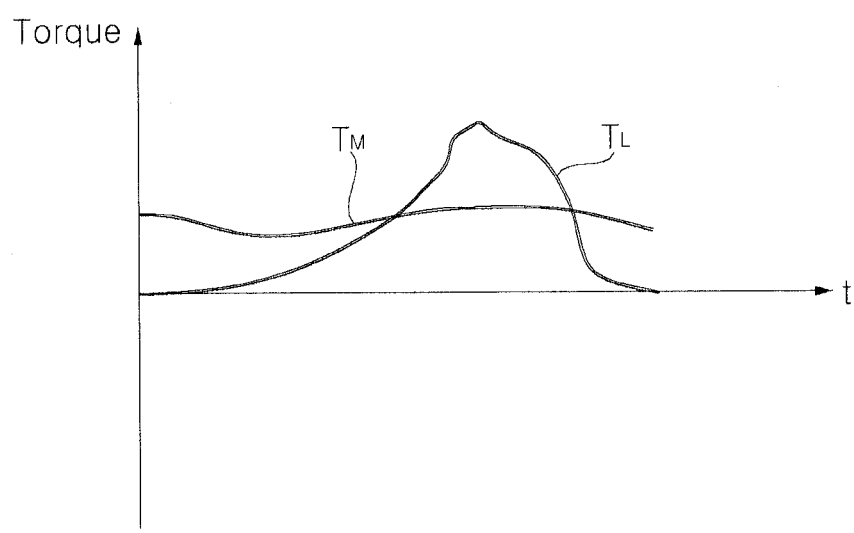

FIG. 4 shows the relationship between a motor torque ($T_M$) and a load torque ($T_L$) of the motor of the single-rotary compressor. The motor torque (TM) denotes a torque for driving a motor, and the load torque (TL) denotes a torque caused by a load applied to a motor. If the motor torque (TM) is larger than the load torque (TL), the motor is accelerated. If the motor torque (TM) is less than the load torque (TL), the motor is decelerated. In addition, in order to start driving the motor from a stationary state, there is a need for the motor torque (TM) to always be higher than the load torque (TL).

As shown in FIG. 4, although the motor torque (TM) has some ripples, the ripples have a relatively uniform pattern. The load torque of the motor of the single-rotary compressor has a large amount of variation. Specifically, excessive load torque variation occurs in a large-capacity single-rotary compressor.

Figure 5:
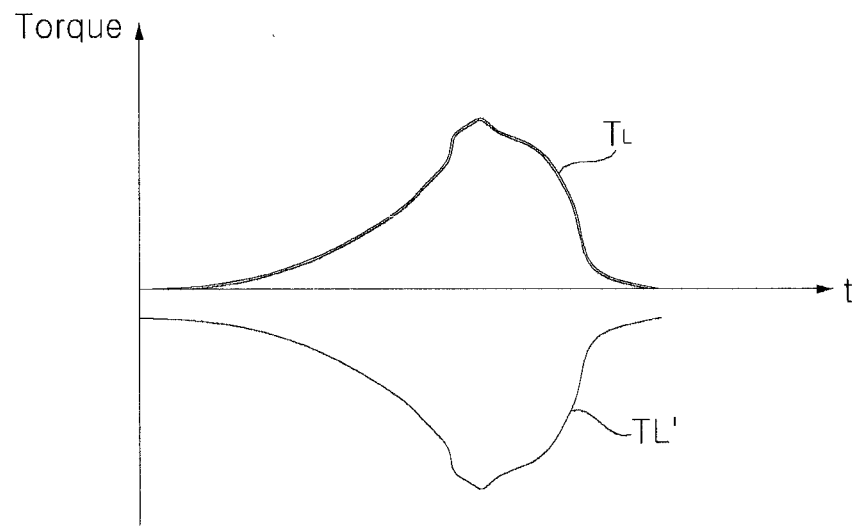

In order to compensate for the load torque variation, there is used the compensation torque (TL') that has the same magnitude as that of the load torque (TL) while simultaneously being in the opposite direction to the load torque (TL), as shown in FIG. 5. In reality, the compensation torque (TL') can be applied by adjusting the magnitude and frequency of a phase current applied to the motor torque (TM) to increase the motor torque (TM).

Ideally, the compensation torque (TL') is in the opposite direction to the load torque (TL) and has the same phase as that of the load torque (TL). However, in reality, even in the case of applying the phase current and phase for generating the compressor torque (TL') having the same pattern as that of the load torque (TL) after measuring the load torque (TL), the compensation torque (TL') having the opposite magnitude to that of the correct load torque (TL) is not generated. The reason why the aforementioned compensation torque (TL') having the opposite magnitude as that of the correct load torque (TL) is not generated is that, a mechanical error, an electrical error, and load variation are unavoidably generated when a specific phase current and a phase signal are input to the compressor motor, and thus the correct compensation torque (TL') corresponding to the specific phase current and phase signal is not generated.

Figure 6:
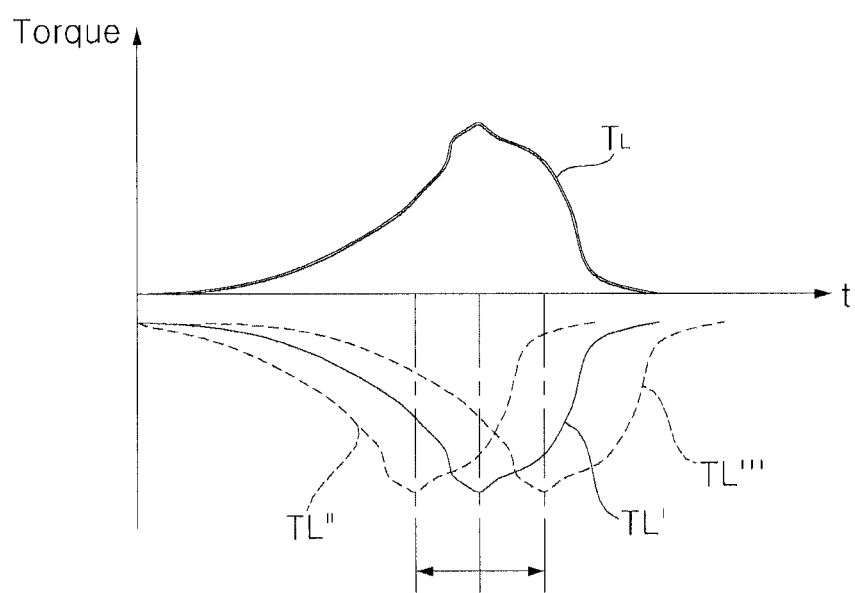

Specifically, in reality, a phase difference of the compensation torque (TL') causes many problems. In other words, as shown in FIG. 6, although a phase current and a phase angle for the compensation torque (TL') compensating for the load torque (TL) are input to the compressor motor, the phase error is actually generated, such that a compensation torque (TL"), a phase of which is leading the ideal compensation torque (TL'), or other compensation torque (TL'"), a phase of which is lagging the ideal compensation torque (TL'), may be applied to the compressor torque.

In accordance with the present invention, the phase error is not calculated from the load torque (TL), a phase compensation angle for minimizing a speed ripple is measured while a frequency and phase current of the motor are fixed. The measured phase compensation angles are configured in the form of a table, and a method for deciding a phase of the compensation torque (TL') to be applied to the compressor motor by referring to the configured table is used.

That is, under the condition that the phase current of the motor is fixed to an arbitrary value and a frequency of the motor is changed, a phase compensation angle capable of minimizing the speed ripple at each frequency is measured.

In addition, under the condition that the frequency of the motor is fixed to an arbitrary value and the phase current of the motor is changed, a phase compensation angle capable of minimizing the speed ripple of the motor at each phase current value is measured. Thereafter, in accordance with the present invention, when driving the motor, instead of applying the compensation torque (TL') by referring to the load torque (TL) of the motor, an optimum phase compensation angle corresponding to the frequency or phase current applied to the motor, i.e., the phase compensation angle for minimizing the speed ripple, is applied to the motor.

Figure 7:
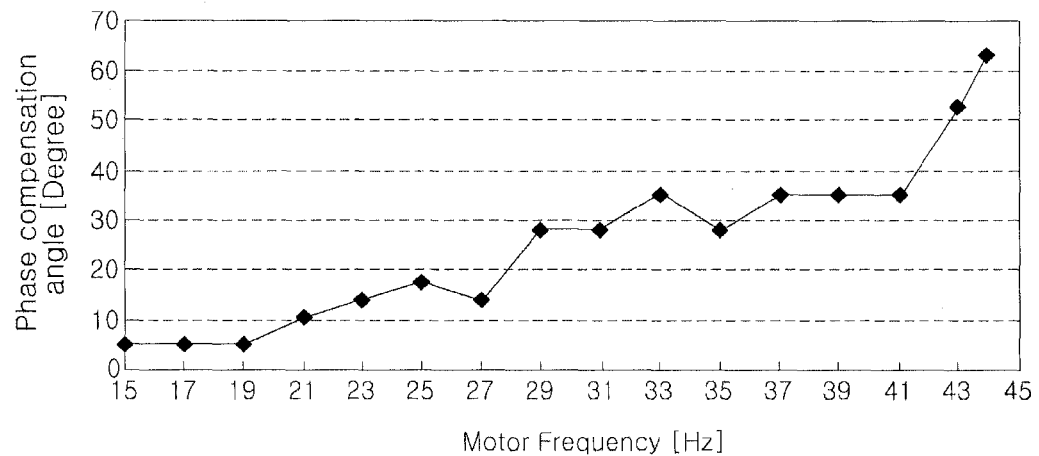
FIG. 7 is a graph illustrating measurements of optimum phase compensation angles about respective frequencies, wherein the measurement of each frequency is obtained while a phase current of a motor is fixed to a predetermined value and a frequency of the motor is changed.

FIG. 7 is a graph illustrating measurements of optimum phase compensation angles about respective frequencies, wherein the measurement of each frequency is obtained while a phase current of a motor is fixed to a predetermined value and a frequency of the motor is changed.

Figure 8:
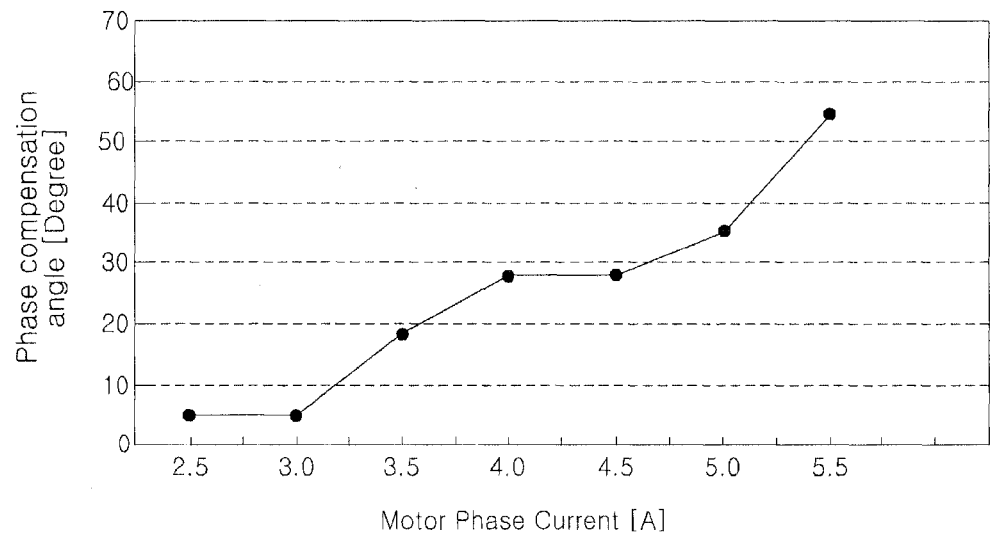
FIG. 8 is a graph illustrating measurements of optimum phase compensation angles about respective phase currents, wherein the measurement of each phase current is obtained while a frequency of the motor is fixed to a predetermined value and a phase current of the motor is changed.

FIG. 8 is a graph illustrating measurements of optimum phase compensation angles about respective phase currents, wherein the measurement of each phase current is obtained while a frequency of the motor is fixed to a predetermined value and a phase current of the motor is changed.

The measurement results of FIG. 7 are configured in the form of a table, and the configured table is shown in FIG. 9. The measurement results of FIG. 8 are configured in the form of a table, and the configured table is shown in FIG. 10. For example, in the case of driving the motor for use in the compressor, the controller of the compressor measures the phase current and frequency applied to the motor, detects an optimum phase compensation value corresponding to each phase current or each frequency is detected from FIG. 9 or FIG. 10, such that the controller applies the compensation torque (TL') using a phase compensation angle corresponding to the detected optimum phase compensation value.

In accordance with another embodiment, if an optimum phase compensation value corresponding to the phase current of the currently driven motor is different from an optimum phase compensation angle corresponding to the frequency, an average value of the two phase compensation values may be used.

Even if compressor motors are produced on the same assembly line, individual compressor motors have different load torque characteristics when they are actually driven. In accordance with a method proposed by the present invention, the method configures a table indicating the relationship among a phase current, a frequency, and an optimum phase compensation angle of each manufactured motor, and stores the table either in a controller of the compressor or in a storage unit readable by the compressor, such that the load torque (TL) of the driving device can be optimally compensated for.

Figure 11:
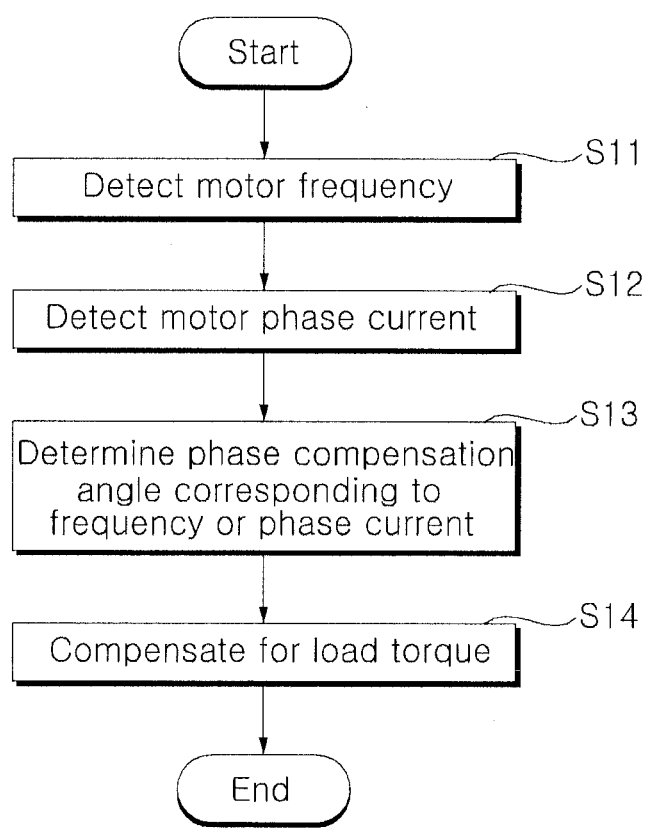
FIG. 11 is a flowchart illustrating a method for compensating for load torque using an optimum phase compensation angle according to an embodiment of the present invention.

FIG. 11 is a flowchart illustrating a method for compensating for load torque using an optimum phase compensation angle according to an embodiment of the present invention.

Referring to FIG. 11, a frequency of a motor for the compressor of the air conditioner is detected at step S11.

At step S12, the phase current of the motor is detected. At step S13, phase compensation angles corresponding to the detected phase current and the detected frequency are determined from the stored table. At step S14, a compensation torque is generated using the determined phase compensation angle. That is, the load torque is compensated for. In accordance with another embodiment, if a phase compensation angle corresponding to the detected phase current is different from a phase compensation angle corresponding to the detected frequency, an average value of the two phase compensation angles may be used.

Figure 12:
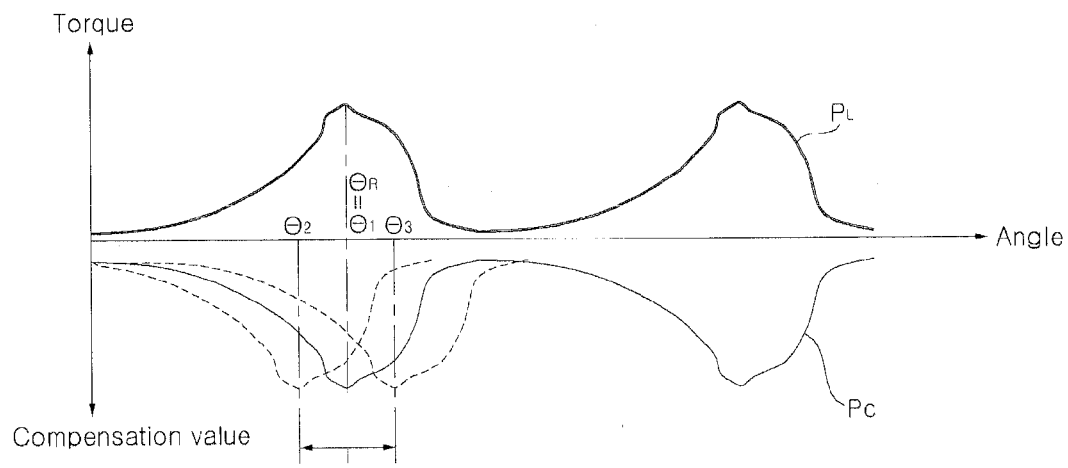
FIGS. 12 and 13 show a load torque pattern and a compensation pattern according to an embodiment of the present invention.
Figure 13:
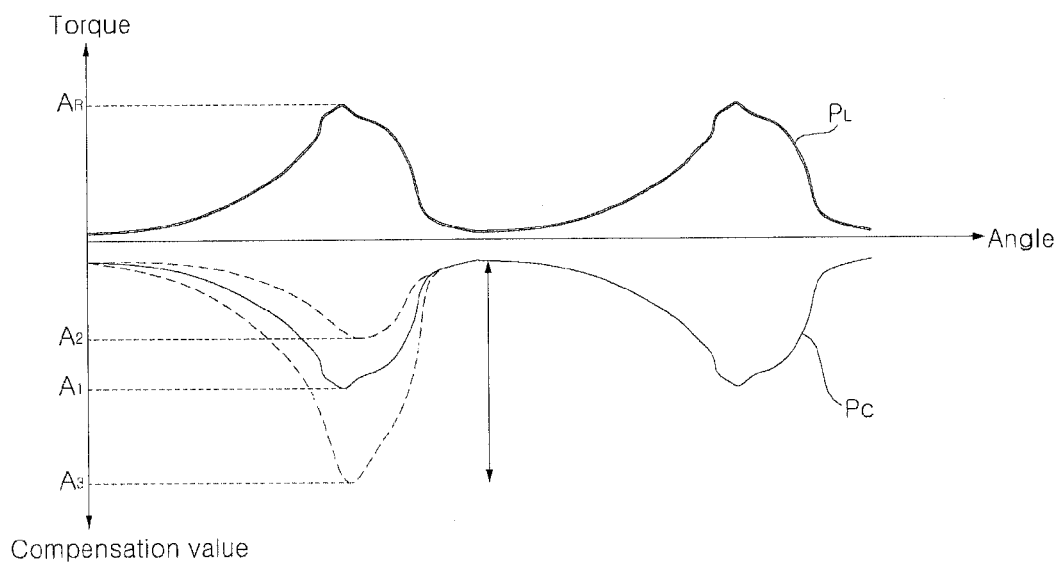
Figure 14:
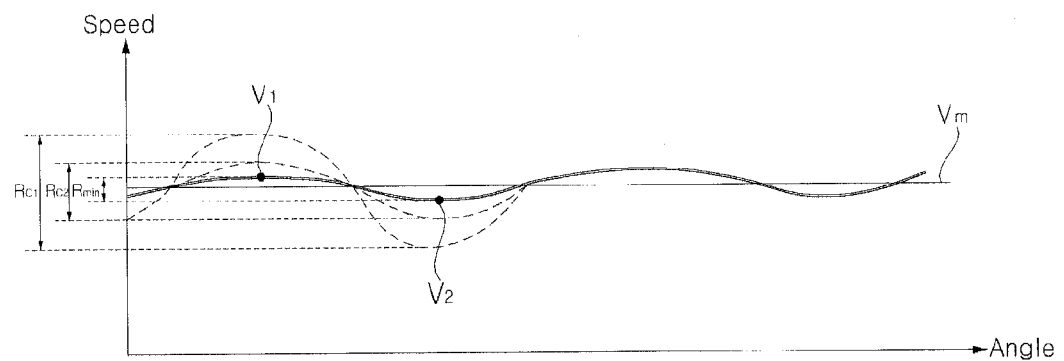
FIG. 14 shows a speed ripple of a motor according to an embodiment of the present invention.

FIGS. 12 and 13 show a load torque pattern and a compensation pattern according to an embodiment of the present invention. FIG. 14 shows a speed ripple of a motor according to an embodiment of the present invention.

Referring to FIGS. 12 and 13, during the driving process of the motor 250, a load torque pattern (PL) based on two periods and a load torque compensation pattern (PC) corresponding to the load torque pattern (PL) are shown. FIG. 14 shows a driving speed of the motor 250 and a variation of speed ripple.

First, referring to FIGS. 12 to 14, the load torque pattern (PL) exhibits fluid resistance to compression during the compression process of fluid such as refrigerant. That is, the load torque pattern (PL) exhibits a variation of load torque. After the aforementioned torque is increased along a non-linear curve wherein a slope of the load torque pattern (PL) is gradually increased, the PL slope is abruptly reduced at a peak value at which maximum compression is provided in such a manner that the PL slope is increased and reduced along the non-linear curve.

On the other hand, the controller 230 stores a load torque compensation pattern (PC) formed to correspond to the load torque pattern (PL).

The controller 230 substitutes an average value of the input current applied to the motor 250 into the load torque compensation pattern (PC), calculates a compensation current value, and adds the compensation current value to the input current value, such that the speed ripple value of the motor 250 in response to the load torque pattern (PL) is minimized.

However, assuming that a parameter for a predetermined load torque compensation pattern (PC) (e.g., a specific phase and amplitude (i.e., a phase current applied to the motor 250)) is different from another parameter (i.e., a phase compensation angle and amplitude) obtained when the load torque pattern (PL) is actually applied to the motor 250 by a predetermined magnitude, the speed ripple may be unexpectedly increased.

A method for adjusting the phase and amplitude of the load torque compensation pattern (PC) in response to the load torque pattern (PL) will hereinafter be described with reference to the annexed drawings.

First, referring to FIGS. 12 to 14, assuming that the load torque pattern (PL) has a predetermined phase (e.g., a reference phase θR), it is necessary for the load torque compensation pattern (PC) to have a first phase compensation angle (θ1) identical to the reference phase (θR). However, the load torque pattern (PL) is matched with the load torque compensation pattern (PC), such that the speed ripple of the motor 250 reaches a minimum speed ripple value (Rmin).

In this case, the magnitude of the speed ripple of the motor 250 is in the range from a maximum speed value (V2) to a minimum speed value (V2) within any one period on the basis of an average speed value (Vm)

In accordance with the embodiment of the present invention, the minimum speed ripple value (Rmin) may be set to a specific speed between 0 Hz (where no speed ripple occurs) and 1.5 Hz.

On the other hand, assuming that the load torque compensation pattern (PC) has either of a second phase compensation angle (θ2) and a third phase compensation angle (θ3), each of which is spaced apart from the reference phase (θR) by a predetermined angle or more, the speed ripple may be configured to have a first threshold speed ripple value (Rc3) or a second threshold speed ripple value (Rc2).

In accordance with the embodiment of the present invention, for example, the first threshold speed ripple value (Rc1) may be set to 3 Hz, and the second threshold speed ripple value (Rc2) may be set to 1.5 Hz.

That is, the larger the phase difference between the load torque pattern (PL) and the load torque compensation pattern (PC), the larger the speed ripple.

Therefore, assuming that the speed ripple is higher than the first threshold speed ripple value (Rc1) or the second threshold speed ripple value (Rc2), the phase compensation angle of the load torque compensation pattern (PC) is adjusted not only in a first direction related to an angle but also in a second direction opposite to the first direction, and a phase of the load torque compensation pattern (PC) is extracted at a specific time at which the speed ripple reaches the minimum speed ripple (Rmin), such that the load torque compensation pattern (PC) may be configured to have a compensation angle of the extracted phase.

In addition, when the phase compensation angle of the load torque compensation pattern (PC) is adjusted in the first direction or the second direction, the magnitude of the phase compensation angle displacement is divided into several steps, such that the phase compensation angle can be precisely adjusted in response to the magnitude of the speed ripple.

The operation for adjusting the phase compensation angle of the load torque compensation pattern (PC) will hereinafter be described in detail.

Figure 15:
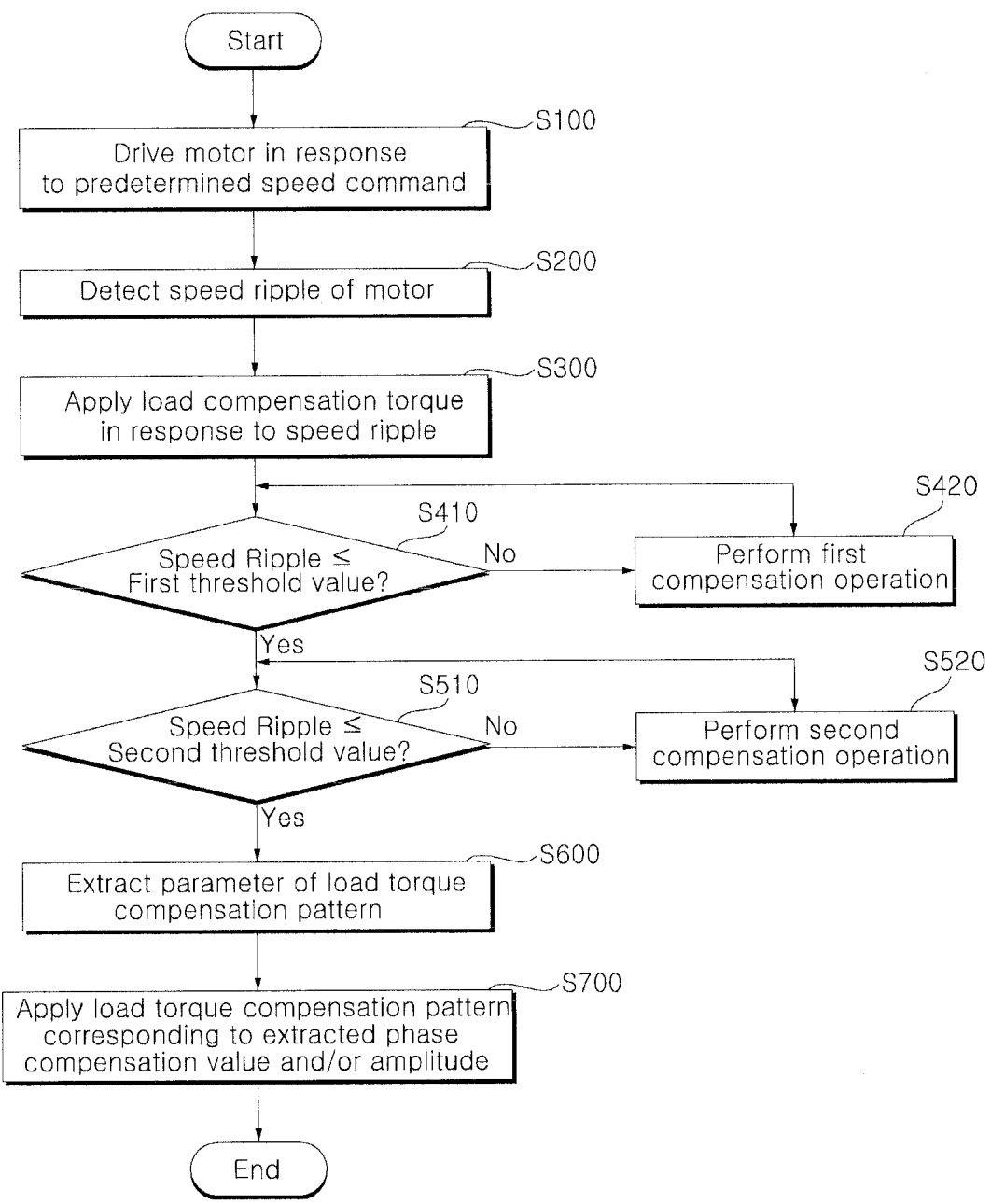
FIG. 15 is a flowchart illustrating a method for controlling a compressor driving apparatus of an air conditioner according to an embodiment of the present invention.

Then, referring to FIGS. 13 and 15, in the same manner as in the aforementioned adjusting of the phase compensation angle, assuming that the load torque pattern (PL) has a predetermined amplitude (e.g., a reference amplitude (AR)), it is necessary for the load torque compensation pattern (PC) to also have a first amplitude (A1) identical to the reference amplitude (AR). However, the load torque pattern (PL) is matched with the load torque compensation pattern (PC), such that the speed ripple of the motor 250 reaches a minimum speed ripple value (Rmin).

On the other hand, assuming that the load torque compensation pattern (PC) has a second amplitude (A2) or a third amplitude (A3), the speed ripple may have a first threshold speed ripple value (Rc3) or a second threshold speed ripple value (Rc2).

That is, the larger the amplitude difference between the load torque pattern (PL) and the load torque compensation pattern (PC), the larger the speed ripple.

Therefore, in the same manner as in the aforementioned phase adjusting, assuming that the speed ripple is higher than a first threshold speed ripple value (Rc1) or a second threshold ripple value (Rc2) because of the amplitude difference, the amplitude of the load torque compensation pattern (PC) is adjusted not only in a first direction related to the magnitude of a gain value but also in a second direction opposite to the first direction, and the amplitude of the load torque compensation pattern (PC) is extracted at a specific time at which the speed ripple reaches the minimum speed ripple (Rmin), such that the load torque compensation pattern (PC) may be configured to have the extracted amplitude.

In addition, when the amplitude of the load torque compensation pattern (PC) is adjusted in the first direction or the second direction, the magnitude of the amplitude displacement is divided into several steps, such that the amplitude can be precisely adjusted in response to the magnitude of the speed ripple.

The operation for adjusting the amplitude of the load torque compensation pattern (PC) will hereinafter be described in detail.

FIG. 15 is a flowchart illustrating a method for controlling the compressor driving apparatus of the air conditioner according to an embodiment of the present invention.

Referring to FIG. 15, by a predetermined speed command, i.e., by an operation signal received from an external part or by an operation signal predetermined by an algorithm, the motor 250 of the compressor driving apparatus 200 is driven at step S100.

Thereafter, the speed ripple of the driven motor 250 is detected at step S200.

In this case, if the motor 250 is sensorlessly driven, the controller 230 may calculate the speed ripple using the speed command and the input current. In addition, in the case of using an additional sensor, the controller 230 may calculate the speed ripple in response to the relative position of the rotor measured by the sensor.

After that, the controller 230 applies the load compensation torque corresponding to the detected speed ripple to the motor 250 at step S300. In this case, as described above, the controller 230 controls the inverter 220, such that it calculates a compensation current value by applying the load torque compensation pattern (PC) to the average value of the input current, adds the compensation current value to the input current value, and applies the resultant current value to the motor 250.

Thereafter, the controller 230 determines whether the speed ripple value is equal to or less than the first threshold value (Rc1) at step S410. If the speed ripple is equal to or less than the first threshold value (Rc1) at step S410, the controller 230 determines whether the speed ripple is equal to or less than the second threshold value (Rc2) at step S510.

Then, if the speed ripple is equal to or less than the second threshold value (Rc2) at step S510, the controller 230 extracts a parameter of the load torque compensation pattern (PC) (i.e., the phase compensation angle and/or amplitude, for example, a first phase compensation angle (θ1) and/or the first amplitude A1) at step S600, such that it controls the load torque compensation pattern (PC) corresponding to the extracted phase compensation angle and/or amplitude to be adaptively applied to the motor 250 at step S700.

In addition, in the operation (S410) for determining whether the speed ripple is equal to or less than the first threshold value (Rc1) or in the operation (S510) for determined whether the speed ripple is equal to or less than the second threshold value (Rc2), assuming that the aforementioned speed ripple is higher than the first threshold value (Rc1) at step S410, the controller 230 performs a first compensation operation at step S420, and returns to step S410, and further, assuming that the aforementioned speed ripple is higher than the second threshold value (Rc2) at step S510, the controller 230 performs a second compensation operation at step S520, and returns to step S510.

A method for performing the first compensation operation and the second compensation operation according to the embodiment of the present invention will hereinafter be described with reference to FIGS. 16 and 17.

Figure 16:
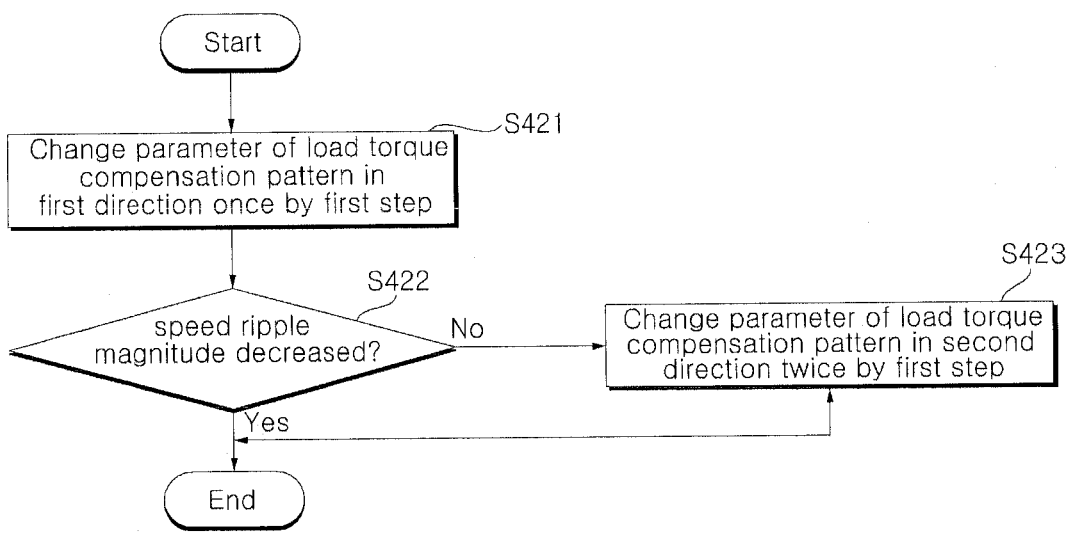
FIGS. 16 and 17 are flowcharts illustrating a first compensation operation and a second compensation operation shown in FIG. 15, respectively.
Figure 17:
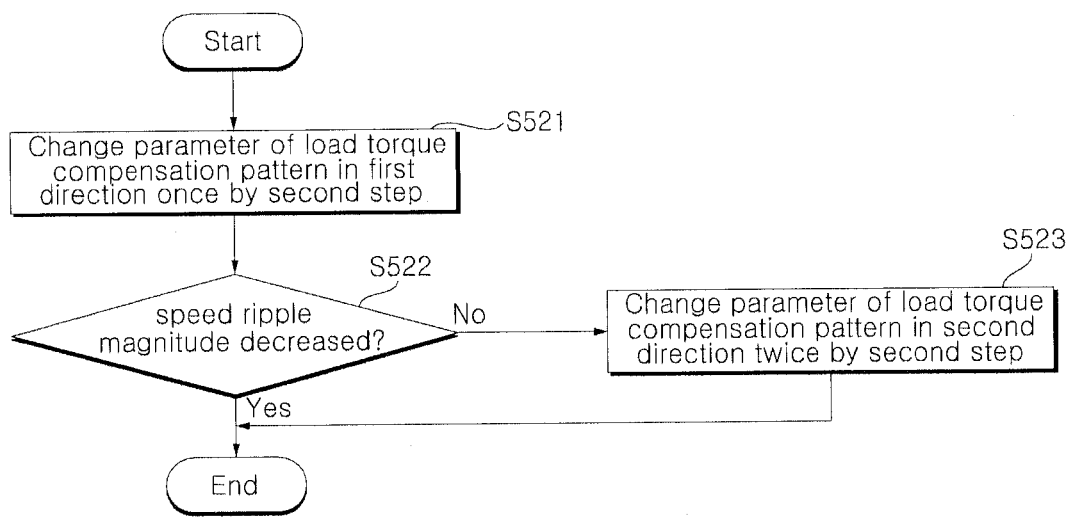

FIGS. 16 and 17 are flowcharts illustrating a first compensation operation and a second compensation operation shown in FIG. 15, respectively.

First, referring to FIG. 16, a parameter of the load torque compensation pattern (PC) (i.e., the phase compensation angle or the amplitude magnitude) is changed in the first direction once by a first step at step S421. In this case, the first step of the phase compensation angle may be 3°, and the first step of the amplitude magnitude may be three units of a gain value.

After that, the controller 230 determines whether the magnitude of the speed ripple is reduced at step S422. If the speed ripple magnitude is reduced at step S422, the controller 230 completes the first compensation operation S420.

In contrast, if the speed ripple magnitude is not reduced at step S422, i.e., if the speed ripple magnitude is increased, the controller 230 determines that the direction of the parameter change was incorrectly established, changes the amplitude magnitude in the second direction twice by a first step at step S423, and completes the first compensation operation S420.

Thereafter, referring to FIG. 17, a parameter of the load torque compensation pattern (PC) (i.e., the phase compensation angle or the amplitude magnitude) is changed in the first direction once by a second step at step S521. In this case, the second step of the phase compensation angle may be 1°, and the first step of the amplitude magnitude may be one unit of a gain value.

In contrast, if the speed ripple magnitude is not reduced at step S522, i.e., if the speed ripple magnitude is increased, the controller 230 determines that the direction of the parameter change was wrongly established, changes the amplitude magnitude in the second direction twice by a second step at step S523, and completes the second compensation operation S520.

Although the phase and amplitude of the motor driving apparatus 200 have been established on the basis of a peak value of patterns according to the embodiments of the present invention, it should be noted that the phase and amplitude of the motor driving apparatus 200 may also be established on the basis of characteristic phases and amplitudes of the remaining parts other than the peak value of the patterns without departing from the scope and spirit of the present invention.

In addition, although the embodiments of the present invention have disclosed that the aforementioned parameters of the load torque compensation pattern (PC) are adjusted by two steps, it should be noted that the aforementioned parameters may also be precisely adjusted by three or more steps as necessary.

In addition, the parameters of the load torque compensation pattern (PC), i.e., the phase compensation angle and the amplitude may be adaptively adjusted at the same time, or only one of the phase compensation angle and the amplitude may also be adjusted as necessary.

As is apparent from the above description, the apparatus and method for driving the compressor of the air conditioner according to the present invention can provide compensation torque having an optimum phase compensation angle so as to minimize a speed ripple of a motor for use in the compressor driving apparatus.

In accordance with the present invention, when the motor is driven, load compensation torque corresponding to load torque is provided as a pattern to the motor, such that the speed ripple of the motor can be minimized.

In addition, although the load compensation torque is not matched with actual load torque and thus the speed ripple is generated, the compressor driving apparatus or method according to the present invention completely matches the load torque with the load compensation torque by adjusting parameters of the load compensation torque, such that the speed ripple can be restricted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for driving a compressor of an air conditioner, comprising:
   a motor that rotates the compressor;
   an inverter including a plurality of switching elements, that outputs AC power having a predetermined phase and a predetermined amplitude by a switching operation of the plurality of switching elements and drives the motor; and
   a controller that detects a frequency and a phase current of the motor for the compressor, determines a phase compensation angle based on the frequency and the phase current, and compensates for load torque of the motor using the determined phase compensation angle, wherein the phase compensation angle is an average value of a phase compensation angle corresponding to the frequency and a phase compensation angle corresponding to the phase current.

2. An apparatus for driving a compressor of an air conditioner, comprising:
   a motor that rotates the compressor;
   an inverter including a plurality of switching elements, that outputs AC power having a predetermined phase and a predetermined amplitude by a switching operation of the switching elements and drives the motor; and
   a controller that detects a frequency and a phase current of the motor for the compressor, determines a phase compensation angle corresponding to at least one of the frequency or the phase current, and compensates for load torque of the motor using the determined phase compensation angle, wherein the controller determines whether a speed ripple of a rotor of the motor is increased or decreased after applying a load compensation torque to the motor, adaptively applies the load compensation torque in response to an increase or decrease in the speed ripple, and provides a current to control the motor using a parameter providing the load compensation torque when the speed ripple is equal to or less than a predetermined threshold value.

3. The apparatus according to claim 2, wherein the parameter includes at least one of a phase current value of the motor or a phase compensation angle of the motor.

4. The apparatus according to claim 2, wherein the controller changes an amplitude of the load compensation torque or a phase of the load compensation torque, and applies the changed amplitude or phase.

5. The apparatus according to claim 2, wherein the controller, if the speed ripple is decreased, decreases the amplitude of the load compensation or the phase of the load compensation torque stepwise, and detects a speed ripple in response to the decreased load compensation torque.

6. A method for controlling a compressor driving apparatus of an air conditioner, comprising:
   detecting a frequency of a motor for use in a compressor;
   detecting a phase current of the motor for use in the compressor;
   determining a phase compensation angle based on the frequency and the phase current; and
   compensating for load torque of the motor using the determined phase compensation angle, wherein the phase compensation angle is an average value of a phase compensation angle corresponding to the frequency and a phase compensation angle corresponding to the phase current.

7. A method for controlling a compressor driving apparatus of an air conditioner, comprising:
   detecting a frequency of a motor for use in a compressor;
   detecting a phase current of the motor for use in the compressor;
   determining a phase compensation angle corresponding to at least one of the frequency or the phase current;
   compensating for load torque of the motor using the determined phase compensation angle;
   determining whether a speed ripple of a rotor of the motor is increased or decreased;
   adaptively applying a load compensation torque in response to an increase or decrease in the speed ripple;
   extracting a parameter providing the load compensation torque when the speed ripple is equal to or less than a predetermined threshold value; and
   controlling the motor using the parameter.

8. The method according to claim 7, wherein the parameter includes at least one of a phase current value of the motor or a phase compensation angle of the motor.

9. The method according to claim 7, wherein the adaptively applying of the load compensation torque includes changing an amplitude or phase of the load compensation torque.

10. The method according to claim 9, further comprising:
    decreasing an amplitude or phase of the load compensation torque stepwise; and
    detecting a speed ripple in response to the decreased load compensation torque.

* * * * *